(12) United States Patent
Ando et al.

(10) Patent No.: US 6,692,722 B2
(45) Date of Patent: Feb. 17, 2004

(54) MANUFACTURING METHOD OF ZEOLITE FROM WASTE

(75) Inventors: Takao Ando, Fujinomiya (JP); Teruo Henmi, Matsuyama (JP); Yoshihisa Asada, Chiba (JP)

(73) Assignees: Furukawa Electric Co., Ltd., Tokyo-to (JP); Kyowa Jigyo K.K., Tokyo-to (JP)

( * ) Notice: Subject to any disclaimer, the term of this patent is extended or adjusted under 35 U.S.C. 154(b) by 0 days.

(21) Appl. No.: 10/184,067

(22) Filed: Jun. 28, 2002

(65) Prior Publication Data

US 2003/0049199 A1 Mar. 13, 2003

(30) Foreign Application Priority Data

Jun. 29, 2001 (JP) .................................. P2001-198501

(51) Int. Cl.[7] .............................................. C01B 39/02
(52) U.S. Cl. ...................................... 423/700; 423/712
(58) Field of Search .................................. 423/700, 712

(56) References Cited

U.S. PATENT DOCUMENTS

| | | | | |
|---|---|---|---|---|
| 3,586,479 A | * | 6/1971 | Heinze et al. ............... | 423/713 |
| 3,714,366 A | * | 1/1973 | Fukuda et al. ............... | 423/712 |
| 4,471,148 A | * | 9/1984 | Vogt et al. .................. | 585/640 |
| 5,401,487 A | * | 3/1995 | Puerto et al. ................ | 423/172 |
| 6,299,854 B1 | * | 10/2001 | Henmi et al. ................ | 423/700 |
| 6,451,282 B1 | * | 9/2002 | Siklosi et al. ................ | 423/712 |

FOREIGN PATENT DOCUMENTS

| | | | | | |
|---|---|---|---|---|---|
| EP | | 392400 B | * | 7/1996 | |
| JP | | 2001089133 A | * | 4/2001 | ........... C01B/39/02 |

\* cited by examiner

*Primary Examiner*—David Sample
(74) *Attorney, Agent, or Firm*—Sughrue Mion, PLLC

(57) ABSTRACT

The present invention provides a zero emission type method for effective use permitting economical and effective manufacture of zeolite effectively applicable in various sectors of industry by using silicon-containing waste comprising at least one of exhaust gas treatment sludge mainly comprising $SiO_2$ discharged from an optical film manufacturing plant, optical fiber refuse and preform refuse, and aluminum-containing waste comprising at least one of aluminum dross discharged from an aluminum-related manufacturing plant, aluminum dust collection ashes, sludge mainly comprising aluminum hydroxide, cleaning waste liquid of aluminum or an alloy thereof, scrap of metal aluminum or an alloy thereof, and alumina scrap.

8 Claims, No Drawings

US 6,692,722 B2

MANUFACTURING METHOD OF ZEOLITE FROM WASTE

BACKGROUND OF THE INVENTION

1. Field of the Invention

The present invention relates to a method of manufacturing zeolite using waste discharged from an optical fiber manufacturing plant and from an aluminum-related manufacturing plant.

2. Description of the Related Art

In an optical fiber manufacturing plant, various kinds of waste containing silicon which is a component raw material of optical fibers (hereinafter referred to as "silicon-containing waste") are discharged in the course of manufacturing optical fibers and manufacturing optical fiber products. The thus discharged silicon-containing waste includes, for example, exhaust gas treatment sludge mainly comprising $SiO_2$, optical fiber refuse and preform refuse. Most of such silicon-containing waste have conventionally been used for reclamation without being fully used, except for reuse as subbase course materials.

In an aluminum-related manufacturing plant as well, various kinds of waste containing aluminum (hereinafter referred to as "aluminum-containing waste") are discharged in the course of manufacturing metal aluminum, aluminum alloys or various products thereof. Discharged aluminum-containing waste includes, for example, aluminum dross, aluminum dust collection ash, crystalline aluminum hydroxide sludge, aluminum or aluminum alloy cleaning waste liquid, metal aluminum, metal aluminum scrap, aluminum alloy scrap and alumina scrap. These kinds of aluminum-containing waste have conventionally been used to some extent as a deoxidant or a subbase course material. Most of these refuses have however been disposed of as in the case of silicon-containing waste.

More recently, the United Nations University is urging a project known as the Zero Emission Recycle Initiative for the purpose of working out a new industrial society to eliminate industrial waste. The project is to promote use of waste from an enterprise as a raw material for the other enterprises, with a view to reducing the amount of waste resulting from business activities of the individual enterprises to null in the society as a whole. There is also a demand for achieving zero emission of the silicon-containing waste discharged from optical fiber manufacturing plants and aluminum-containing waste discharged from aluminum-related manufacturing plants.

The present invention was developed to satisfy such a demand, and has an object to effectively use waste discharged from optical fiber manufacturing plants and aluminum-related manufacturing plants as raw materials for manufacturing zeolite to use thus manufactured zeolite in the other industrial sectors.

SUMMARY OF THE INVENTION

The present invention provides a manufacturing method of zeolite from waste, comprising the steps of mixing, with an aqueous alkali solution, a reaction raw material containing at least one of silicon-containing waste discharged from an optical fiber manufacturing plant such as exhaust gas treatment sludge mainly comprising $SiO_2$, optical fiber refuse and preform refuse, and at least one of aluminum-containing waste discharged from an aluminum-related manufacturing plant such as aluminum dross, aluminum dust collection ash, crystalline aluminum hydroxide sludge, aluminum or aluminum alloy cleaning waste liquid, metal aluminum scrap, aluminum alloy scrap and alumina scrap, and heating the resultant mixture to cause a reaction.

The invention provides also a manufacturing method of zeolite from waste, comprising the steps of adding one or more crystal minerals having a specific ratio Si/Al to a zeolite manufacturing raw material prepared by mixing a reaction raw material comprising silicon-containing waste and aluminum-containing waste of which the ratio Si/Al is not specified, thereby manufacturing zeolite of a specific kind corresponding to the crystal minerals.

According to the present invention, it is possible to further accelerate the tendency toward zero emission of waste by reusing unreacted substances or waste liquid discharged from a zeolite synthesizing process as all or part of the above-mentioned reaction raw material again for the manufacture of zeolite.

DESCRIPTION OF THE PREFERRED EMBODIMENTS

Manufacture of zeolite by the zero emission type effective use method of waste, discharged from an optical film manufacturing plant and an aluminum-related manufacturing plant, of the present invention will now be described further in detail.

(1) Silicon Source

In the manufacture of zeolite in the present invention, concrete examples of silicon-containing waste discharged from an optical fiber manufacturing plant used as a silicon source include exhaust gas treatment sludge mainly comprising $SiO_2$, optical film refuse, and preform waste. Waste containing one or more kinds thereof may also be used.

Apart from the above, as required, coal ashes, natural zeolite, pearlite or diatomaceous earth may be used as a silicon source, or general waste other than the above capable of serving as a silicon source may also be used. Such general waste includes, for example, quartz glass and a silicon wafer.

The above-mentioned kinds of silicon-containing waste serving as a silicon source will now be described.

1) Exhaust gas treatment sludge mainly comprising $SiO_2$ is waste discharged from an optical fiber manufacturing plant. More specifically, this means a brown dehydrated cake obtained, from among hydrogen chloride gas, chlorine gas, and silicon oxide fine powder occurring when generating cylindrical lumps (called preforms) of silicon oxide, a manufacturing raw material of optical fiber, by catching $SiO_2$, $Cl_2$ and HCl, adding caustic soda and ferric oxide to adjust pH, then, adding a polymer to cause agglomeration and precipitation, and dehydrating the resultant mixture.

This brown dehydrated cake contains Si in an amount of from about 20 to 25 wt. %. In addition to Si, the cake contains from 35 to 40 wt. % Fe, from 1 to 3 wt. % Ca, from 0 to 1 wt. % Mg, from 0 to 1.5 wt. % Al and the balance incidental impurities, and has a water content of from about 68 to 75%.

Another applicable form of cake is a white dehydrated cake obtained by similarly catching $SiO_2$ and HCl, then, adding caustic soda and polyaluminum chloride to adjust pH, adding a polymer to cause agglomeration and precipitation, and dehydrating the same. The white dehydrated cake contains from about 60 to 70 wt. % Si. In addition to Si, the cake contains from 0 to 1 wt. % Fe, from 0 to 1 wt. % Ca, from 0 to 1 wt. % Mg, from 7 to 12 wt. % Al and the balance incidental impurities, with a water content of from about 65 to 70%.

The white dehydrated cake and the brown dehydrated cake, which are two types of exhaust gas treatment sludge mainly comprising $SiO_2$, are very excellent in reactivity, and therefore, satisfactorily applicable as silicon sources serving as materials for zeolite.

Particularly, the brown dehydrated cake, which contains about 30 wt. % Fe, is suitable for the manufacture of Fe-containing zeolite. Fe-containing zeolite contains $Fe^{2+}$ as exchangeable cation, and Fe serving as a buffer. As a result, even when Fe-containing zeolite is ion-exchanged, Fe is supplied from the buffer. It can therefore retain the function as Fe-containing zeolite for a long period of time. The white dehydrated cake, containing from 7 to 12 wt. % Al in addition to Si constituent, can be used as an effective raw material for manufacture of zeolite even with the white dehydrated cake alone. It is thus a very characteristic material.

2) Polishing chips of the above-mentioned preform and optical fiber refuse are applicable as silicon sources. Such preform polishing chips and optical fiber refuse have a very high silicon content and can be used favorably as silicon sources. Particularly, because of the very high purity of silicon, these materials can be used favorably for inductive synthesis of zeolite having a FAU structure.

Silicon contained in waste liquid discharged from a zeolite manufacturing process described later ca be reused as a silicon source, thus permitting achievement of a higher degree of zero emission.

(2) Aluminum Source

Kinds of aluminum-containing waste discharged from an aluminum-related manufacturing plant, applicable as an aluminum source, another reaction raw material in the manufacture of zeolite in the present invention include aluminum dross, aluminum dust collection ashes, sludge mainly comprising aluminum hydroxide, aluminum or aluminum alloy cleaning waste liquid, metal aluminum scrap, aluminum alloy scrap, and alumina scrap. One or more of these aluminum sources may be used. Any of other kinds of waste may be used with no problem so far as it is aluminum-containing waste discharged from an aluminum-related manufacturing plant. Aluminum-containing waste as described above may be in any one of such forms as a liquid, clayey or fluid form comprising a mixture of liquid and solids as slurry, or a solid.

The aforementioned types of aluminum-containing waste serving as aluminum sources will now be described.

1) Aluminum dross means dross, containing AlN, Al and $Al_2O_3$, floating on the molten aluminum surface or precipitated on the bottom of an aluminum melting furnace (also known as slag). Because of a high aluminum content, aluminum dross can serve as a main aluminum source. Such aluminum dross contains from about 62 to 98 wt. % Al. In addition to Al, it contains from 0 to 15 wt. % Mg, from 0 to 3 wt. % Cl, from 0 to 3 wt. % F, from 0 to 2 wt. % S, from 0 to 2 wt. % K, from 0 to 2 wt. % Na, from 0 to 2 wt. % Ti, from 0 to 2 wt. % Si, from 0 to 2 wt. % Fe, from 0 to 1 wt. % Cr, from 0 to 1 wt. % Mn, from 0 to 1 wt. % Cu, from 0 to 1 wt. % Zn, from 0 to 1 wt. % Ni, and the balance incidental impurities.

Aluminum dross comprising AlN generates ammonia ($NH_3$) gas through a reaction with water. By collecting this ammonia gas and feeding the same to a zeolite manufacturing process described later, it is possible to manufacture NH3-type zeolite.

2) This aluminum dross is dust-sucked upon classifying and crushing in the manufacturing process and discharged as dust collection ashes comprising fine-grain ash having a particle size of up to 2.5 mm, medium-grain ash having a particle size of from over 5 to 15 mm, and coarse-grain ash having a particle size of over 15 mm. These dust collection ashes are also applicable as an aluminum source.

3) Crystalline aluminum hydroxide (gypsite), expressed as crystalline $Al(OH)_3$, is an aluminum-containing waste occurring in the course of manufacture of an aluminum sheet or an aluminum alloy sheet. More specifically, it is obtained by centrifugally separating crystalline aluminum hydroxide produced when etching-degassing a cold-rolled aluminum sheet or an aluminum alloy sheet by means of an aqueous caustic soda solution. Sludge mainly comprising aluminum hydroxide (crystalline aluminum hydroxide sludge), having a high aluminum content, can be used as a main aluminum source. Sludge mainly comprising aluminum hydroxide contains Al in an amount of from about 90 to 99 wt. %. In addition to Al, the sludge contains from 0 to 1 wt. % Na, from 0 to 0.3 wt. % Fe, from 0 to 0.2 wt. % Si, from 0 to 0.2 wt. % Ca, from 0 to 1 wt. % Mn, from 0 to 1 wt. % Mg, from 0 to 1 wt. % Cl, and the balance incidental impurities.

4) Aluminum or aluminum alloy cleaning waste liquid is a caustic waste liquid containing $NaAlO_2$ and $Al(OH)_3$ as an aluminum source. More specifically, it is a solution discharged upon dissolving an aluminum alloy adhering to an aluminum extruding die with a strong base solution, such as, for example, an NaOH solution having a concentration of about 4 mol/L (=N) containing an aluminum source of about 3 to 10%. In this respect, $NaAlO_2$ is collected in a state dissolved in an alkali solution, and $Al(OH)_3$ is collected in a state precipitation-treated into solid/solution separable crystalline $Al(OH)_3$. The aluminum cleaning solution as described above, containing an aluminum source and an alkali constituent serving as zeolite raw materials, is suitably applicable for the waste using method of the present invention.

5) In addition to the above-mentioned types of aluminum-containing waste, metal aluminum scrap, aluminum alloy scrap, and alumina scrap arbitrarily produced in the processes in an aluminum-related manufacturing plant are also types of waste having a high aluminum content, and are therefore applicable as aluminum sources in the present invention.

If the amount of aluminum-containing waste discharged from an aluminum manufacturing plant alone is insufficient as an aluminum source, general waste having a high aluminum content may be used. In this case, zero emission is achieved at least for the aluminum-containing waste discharged from the aluminum manufacturing plant. Applicable types of general waste having a high aluminum content include, for example, types of waste such as an aluminum can, aluminum foil and stainless steel. The aluminum content in these general types of waste should preferably be within a range of from 70 to 90 wt. %: a higher content is more preferable. Kinds of waste containing both aluminum and silicon may also be used, including specifically incineration ashes such as coal ashes, municipal refuse incineration ashes, active sludge incineration ashes, solidified waste combustion ashes, paper-mill sludge, foundry sludge (waste foundry sand), molten slag of ashes, tuff (such as Ooya stone), volcanic ashes, detrital soil (such as Kanuma soil) and gravel.

(3) Aqueous Alkali Solution

As the aqueous alkali solution used together with the above-mentioned reaction raw materials in the manufacture of zeolite in the present invention, it is practically the most convenient to use an aqueous sodium hydroxide solution. That is, zeolite generated in the method of the invention is usually of the sodium (Na+) type. It is therefore necessary to use alkali containing sodium. When using an alkali other than sodium, direct generation of a zeolite having cations corresponding to the alkali used, for example, a zeolite of the K+, NH4+, $Ca^{2+}$ or $Mg^{2+}$ is not observed in practice. When desiring a zeolite of any of these types, it is easily available by applying a cation exchange treatment by a known method to a sodium-type zeolite generated by the method of the invention. When the term "zeolite" is used broadly mean a mineral material having ion-exchange ability or adsorbing ability, and when using an alkali other than sodium, a zeolite in this broad sense of the word is generated. When using a mixed alkali containing sodium, there is available a mixture of a zeolite of the sodium type in the narrow sense of the word and a zeolite of the broader sense as described above, permitting, for particular uses, direct application without the need of isolation and purification of the narrow-sense zeolite alone. In this case, it is not necessary to stickle particularly for the kind of alkali. More specifically, applicable types of alkali other than sodium, include alkali metal hydroxide such as potassium hydroxide, and alkali earth metal hydroxides such as calcium hydroxide and magnesium hydroxide. Some of the above-mentioned silicon sources and aluminum sources are discharged and collected in the form of a aqueous alkali solution of a relatively high concentration. When using such a raw material, it suffices to make adjustments such as dilution or compensation of the shortage of aqueous alkali solution at the stage of raw material coordination so as to achieve a prescribed concentration.

(4) Manufacture of Zeolite

The manufacturing methods of zeolite in the present invention are broadly classified into a usual synthesizing method and an inductive synthesizing method.

1) Usual Synthesizing Method

The usual synthesizing method is a method of synthesizing a zeolite of a kind corresponding to the ratio Si/Al of the zeolite raw material. In other words, it is a synthesizing method in which the kind of manufactured zeolite depends upon the chemical composition of the zeolite raw material. In this synthesizing method, the zeolite raw material comprises a solid raw material or a liquid raw material of aluminum-containing waste serving as the above-mentioned aluminum source, a solid raw material or a liquid raw material of silicon-containing waste serving as the above-mentioned silicon source, and an aqueous alkali solution, and prepared by blending these materials at an arbitrary ratio.

For some kinds of silicon-containing waste and aluminum-containing waste used as reaction raw materials, it is necessary to conduct a preliminary treatment in advance, without using as they are. When these materials are in solid, for example, the materials are used after crushing into a particle size of up to 100 µm, or preferably, up to 50 µm so as to achieve easier mixing with the aqueous alkali solution. It is necessary to convert dehydrated cakes into slurry or solution in an aqueous alkali solution. Aluminum dross containing aluminum nitride, which produces ammonia ($NH_3$) gas in a reaction with water, must be degreased. While a liquid material can basically be used as it is, solid impurities not participating in the reaction must be removed through filtration or the like.

Main factors of reaction conditions in the manufacture of zeolite in the present invention include: a) concentration of the aqueous alkali solution; b) solid raw materials/liquid raw materials ratio of the aluminum source and the silicon source; c) reaction temperature and pressure; d) reaction time; and e) stirring effect.

These reaction conditions will now be described.

Although no strict restriction is imposed, the concentration of the aqueous alkali solution should appropriately be from 1 to 4 N (normal; the same applies hereafter), or preferably, from 2 to 3 N. The ratio of the solid raw materials and/or the liquid raw materials of the silicon source and the alumina source to the aqueous alkali solution should preferably be such that [solid and/or liquid raw materials]: [aqueous alkali solution]=1:1 to 1:8. A higher ratio of aqueous alkali solution as 1:4 or 1:8 is usually preferable.

No particular restriction is imposed on the reaction temperature. A reaction temperature is appropriately selected in response to the kind of zeolite to be manufactured. A commonly applicable range should preferably be at least about 80° C., or more preferably, at least 90° C. under atmospheric pressure. The upper limit is 180° C., or preferably, about 120° C.

The reaction is carried out usually under atmospheric pressure. At a high reaction temperature, it is needless to mention that a pressure tight reactor is necessary, and the reaction proceeds under an applied pressure. Causing the reaction under conditions of a high temperature and a high pressure permits activation of thermal vibration of the aqueous alkali solution.

The reaction time is a period of time necessary for generation of zeolite, and largely affected by the other factors. For example, temperature, pressure, and stirring condition exert an important effect on the reaction time. It is necessary to provide usually a reaction time of from several tens of minutes to several hours, or in come cases, even about a day.

The stirring effect has an important effect on solubility of solid constituents through effective attack by the OH group in the aqueous alkali solution particularly to the solid raw materials. More specifically, mechanical stirring such as propeller stirring, turbulent flow, ultrasonic stirring, or stirring based on microwave vibration is suitably adopted. By means of such stirring, it is possible to further improve chances of contact between solid materials and crystal minerals in the attack to the solid materials by the aqueous alkali solution, or in the inductive synthesizing method described later, thus permitting further promotion of the zeolite generating reaction. Stirring is effective even when using a liquid raw materials.

According to the above-mentioned usual synthesizing method, it is possible to synthesize a zeolite of a kind corresponding to the ratio Si/Al of the silicon-containing waste and the aluminum-containing waste used as raw materials. From a different point of view, when manufacturing a zeolite of a predetermined kind, the reaction condition such as the ratio of the silicon-containing waste and the aluminum-containing waste used so as to achieve a ratio Si/Al corresponding to the kind of zeolite to be manufactured, the reaction temperature and the reaction time are adjusted.

A ratio Si/Al of under 2, for example, leads to synthesis of LTA-type zeolite, and a ratio Si/Al of from 2 to 3 leads to synthesis of FAU-type zeolite. As to the reaction temperature and the reaction time, in general, a reaction at a relatively high temperature for a short period of time tends to result in generation of a zeolite of a high ratio Si/Al, and on the other hand, a reaction at a relatively low temperature for a longer period of time, in generation of a zeolite of a low ratio Si/Al.

In the method of the invention, the Si source and the Al source are used at an arbitrary ratio as described above, and there is not particular restriction on the ratio Si/Al in the reaction raw material. When the amount of any one source is extremely slight, a zeolite of a chemical composition corresponding to such a ratio is not generated, but usually, there is generated a zeolite of a kind corresponding to the other reaction conditions at a yield in response to the amount of the constituent in short.

2) Inductive Synthesizing Method

The inductive synthesizing method comprises the steps of adding one or more kinds of crystalline mineral having a specific ratio Si/Al into a reaction mixture prepared by mixing a liquid or solid reaction raw material not having a specific ratio Si/Al and an aqueous alkali solution, inducing a zeolite of a specific kind corresponding to the crystalline mineral, thereby manufacturing such zeolite. In other words, this is a synthesizing method in which the kind of manufactured zeolite does not depend upon the ratio Si/Al of the reaction mixture, but upon the ratio Si/Al of the added crystalline minerals.

In this inductive synthesizing method, the silicon source, the aluminum source, the kind of aqueous alkali solution and the reaction conditions adopted in the above-mentioned usual synthesizing method can be directly applied.

The inductive synthesizing method is characterized in that the kind of synthesized zeolite varies with the ratio Si/Al of the added crystalline minerals. One or more kinds of crystalline mineral having a specific ratio Si/Al can be used. A zeolite of a particular kind is induced and synthesized in response to the kinds of crystalline minerals, the ratio Si/Al and the amount of addition.

As the crystalline minerals, zeolite of a specific kind to be essentially induced is used, and a crystalline substances such as a crystalline silicate other than zeolite is also applicable.

Applicable zeolites serving as crystalline minerals include natural zeolite, synthetic zeolite and artificial zeolite.

Examples of natural zeolite include analcite group, sodalite group, RYUFUTSUSEKI group, natrolite group, staurolite group, and mordenite group and other minerals falling under the zeolite group. Examples of synthetic zeolite include LTA-type)(A3-type, A4-type and A5-type zeolites), FAU-type (zeolites of X-type: ratio Si/Al=1.0 to 1.4; Y-type: ratio Si/Al=1.9 to 2.8), and ZSM-5. Examples of artificial zeolite include faujasite, phillipsite, hydrated sodalite, and an artificial zeolite obtained by inductive synthesizing (FTA and FAU-type zeolite).

Applicable crystalline substances other than zeolite include tektosilicate, phyllosilicate and other crystalline silicates.

In the inductive synthesizing method, fine crystal grains of crystalline mineral should preferably be used. Usually, grains of a size of up to 100 $\mu$m, or more preferably, of up to 10 $\mu$m are used. There is no particular restriction imposed on the amount of addition. From the practical point of view, however, an amount of addition of from 0.01 to 10 wt. % relative to the solids is appropriate. The kinds of one or more crystalline minerals, combination thereof, the ratio Si/Al and the amount of addition thereof can be selected in response to the kind of zeolite to be inductive-synthesized. More specifically, when adding a zeolite having the LTA (such as A-type) structure in an amount of from 0.01 to 10 wt. % as a crystalline mineral, it is possible to synthesize a zeolite having the same LTA (such as A-type) structure as that of the added crystalline mineral. When adding, as a crystalline mineral, a zeolite having the FAU (such as X or Y-type) structure in an amount of from 0.01 to 10 wt. %, it is possible to synthesize a zeolite having the added FAU (X or Y-type) structure, or a zeolite having the LTA (such as A-type) structure of a lower ratio Si/Al than zeolite of the added FAU (X or Y type) structure.

3) Effective Use of Zeolite Manufacturing Waste Liquid

The waste liquid discharged from the zeolite manufacturing process can be used as an aluminum source or a silicon source. It is thus possible to further promote achievement of zero emission. The zeolite manufactured by the method of the invention is effectively applicable in areas of zeolite utilization conventionally known by the full use of the ion-exchange ability or the adsorption ability thereof.

EXAMPLES

The present invention will now be described further in detail by means of concrete examples. The intent of the invention is not limited to these examples.

Optical fiber refuse (1), white dehydrated cake (2), and brown dehydrated cake (3) discharged from an optical fiber manufacturing plant were used as silicon sources; aluminum dust collection ash (4), and sludge mainly comprising aluminum hydroxide (5) discharged from an aluminum manufacturing plant were used as aluminum sources; and an aqueous sodium hydroxide solution of 3N or caustic alkali waste liquid of 2.85 N discharged from an aluminum manufacturing plant (6) was used as aqueous alkali solution. Combinations of these materials (1) to (6) as shown in Table 2 were used as zeolite raw materials. A ratio we Si/Al of 1 or 3 was adopted for the zeolite raw materials, with a solid/liquid ratio of 1:4. Chemical compositions (wt. %) of the adopted aluminum sources and silicon sources are shown in Table 1.

[Table]1

(1) Optical fiber refuse powder: Total $SiO_2$: at least 99.6; Cu (CuO): 0.08; ignition loss: 0.25%/1,050° C.

(2) Dehydrated cake (white): Total $SiO_2$: 64.9; Fe: 0.03; Ca: 0.02; Mg: 0.03; Al: 9.30; incidental impurities: balance; water content: about 68.6%

(3) Dehydrated cake (brown): Total $SiO_2$: 23.8; Fe: 37.4; Ca: 2.11; Mg: 0.11; Al: 0.46; incidental impurities: balance; water content: about 72.0%

(4) Aluminum dust collection ash: Al: 83.4; Mg: 10.2; Cl: 12; F: 1.0; S: 0.6; K: 0.6; Na: 0.5; Ti: 0.5; Si: 0.5; Fe: 0.4; Cr: 0.1; Mn: 0.1; Cu: 0.1; Zn: 0.1; Ni: 0.1; incidental impurities: balance (5) Sludge mainly comprising aluminum hydroxide: Al: 98.5; Na: 0.8; Fe: 0.2; So: 0.1; Ca: 0.1; Mn: up to 0.1; Mg: up to 0.1; Cl: up to 0.1; incidental impurities: balance; water content: about 5%

(6) Alkali cleaning waste liquid: Al: 3.79; incidental impurities: balance; NaOH concentration: 11.4%.

This zeolite raw material in an amount of 14 g was placed in a reactor and subjected to an alkali treatment while stirring under atmospheric pressure at about 105° C. for four hours.

When manufacturing zeolite by the inductive synthesizing method, zeolite of a specific kind was inductively synthesized by adding a crystalline mineral. As the crystalline mineral, zeolite (commercially available) having the LTA (A4 type) structure and zeolite (faujasite: commercially available) of the FAU (F9 type) structure in an amount of 10 wt. %, i.e., 1.4 g were added to the raw material comprising a silicon source and an aluminum source.

After the test, CEC (Cation Exchange Capacity) values were determined through the following measurement.

The determination comprised the steps of replacing exchangeable cations by $Ca^{2+}$ using a 1 N calcium chloride solution, sufficiently rinsing with an 80% ethanol solution, conducting ion exchange between $Ca^{2+}$ and $NH_4^+$ using a 1 N ammonium chloride solution, measuring the $Ca^{2+}$ ion concentration by the atomic absorption spectrochemical method, and calculating CEC values (average values; unit:

m mol/100 g) of the samples. Generated zeolite was confirmed by means of XRD. The result is shown in Table 2.

In Table 2, S represents sodalite and P represents philliplite.

TABLE 2

| | Reaction Raw Materials | | | | | | |
|---|---|---|---|---|---|---|---|
| Ex. | Si | Al | Si/Al | Alkali | Concentration | Additive | CEC | Zeolite |
| 1 | ① | ④ | 1 | NaOH | 3N | — | 13 | S |
| 2 | ① | ④ | 3 | NaOH | 3N | — | 261 | P |
| 3 | ① | ④ | 3 | NaOH | 3N | F9 | 218 | A4 + F9 |
| 4 | ② | ④ | 1 | NaOH | 3N | — | 276 | A4 + F9 |
| 5 | ② | ④ | 3 | NaOH | 3N | — | 335 | F9 |
| 6 | ② | ④ | 3 | NaOH | 3N | F9 | 350 | F9 |
| 7 | ② | ⑤ | 1 | NaOH | 3N | — | 220 | F9 |
| 8 | ② | ⑤ | 3 | NaOH | 3N | — | 180 | F9 |
| 9 | ② | ⑤ | 3 | NaOH | 3N | F9 | 180 | F9 |
| 10 | ② | ④ | 1 | ⑥ | 2.85N | — | 13 | A4 + F9 |
| 11 | ② | ④ | 3 | ⑥ | 2.85N | — | 90 | S + A4 |
| 12 | ② | ④ | 3 | ⑥ | 2.85N | F9 | 120 | A4 + F9 |
| 13 | ② | ⑤ | 1 | ⑥ | 2.85N | — | 50 | S + A4 |
| 14 | ② | ⑤ | 3 | ⑥ | 2.85N | — | 50 | S + A4 |
| 15 | ② | ⑤ | 3 | ⑥ | 2.85N | F9 | 150 | A4 + F9 |
| 16 | ③ | ⑤ | 1 | NaOH | 3N | A4 | 180 | A4 |
| 17 | ③ | ⑤ | 1 | NaOH | 3N | F9 | 200 | F9 |

The result shown in Table 2 suggests that it was possible to manufacture zeolite by the usual synthesizing method by using various kinds of aluminum-containing waste discharged from an aluminum manufacturing plant and various kinds of silicon-containing waste discharged from an optical film manufacturing plant as aluminum and silicon sources. According to Examples 1, 2, 4, 5, 7, 8, 10, 11, 13 and 14, it was possible to achieve zero emission of waste discharged from an aluminum manufacturing plant.

It was also possible to manufacture zeolite by the inductive synthesizing method of adding zeolite of a particular kind. According to Examples 3, 6, 9, 12 and 15 to 17, it was possible to achieve zero emission of waste discharged from an aluminum manufacturing plant and an optical film manufacturing plant.

According to the zero emission type full-use method of the present invention, as described above, it is possible to effectively use aluminum-containing waste discharged from an aluminum manufacturing plant as an aluminum source for a zeolite manufacturing plant, and effectively use silicon-containing waste discharged from an optical film manufacturing plant or general waste as a silicon source for the manufacture of zeolite. The amount of waste from an aluminum manufacturing plant and an optical film manufacturing plant can be brought to null, thus achieving zero emission. According to the present invention, even a kind of waste not having a specific ratio Si/Al can easily serve as a raw material for zeolite by use of the inductive synthesizing method, thus satisfying the requirements of zero emission of waste.

The zeolite manufactured in the present invention is not only effectively applicable in conventionally known uses of zeolite, but also has a very high applicability in other fields of application, thus conforming to the intent of zero emission.

What is claimed is:

1. A manufacturing method of zeolite from waste, comprising the steps of mixing, with an aqueous alkali solution, a reaction raw material containing silicon-containing waste discharged from an optical fiber manufacturing plant and aluminum-containing waste discharged from an aluminum containing manufacturing plant to form a resultant mixture, and heating the resultant mixture to cause a reaction.

2. A manufacturing method of zeolite from waste, according to claim 1, further comprising the steps of adding one or more crystal minerals having a ratio Si/Al to a zeolite manufacturing raw material prepared by mixing a reaction raw material comprising the silicon-containing waste and the aluminum-containing waste thereby manufacturing zeolite corresponding to said crystal minerals.

3. A manufacturing method of zeolite from waste, according to claim 1, wherein the silicon-containing waste is exhaust gas treatment sludge mainly comprising $SiC_2$, optical fiber refuse and preform refuse.

4. A manufacturing method of zeolite from waste, according to claim 1, wherein the aluminum-containing waste is selected from the group consisting of aluminum dross, aluminum dust collection ash, crystalline aluminum hydroxide sludge, aluminum cleaning waste liquid, aluminum alloy cleaning waste liquid, metal aluminum scrap, aluminum alloy scrap, and alumina scrap.

5. A manufacturing method of zeolite from waste, according to claim 3, wherein the aluminum-containing waste is selected from the group consisting of aluminum dross, aluminum dust collection ash, crystalline aluminum hydroxide sludge, aluminum cleaning waste liquid, aluminum alloy cleaning waste liquid, metal aluminum scrap, aluminum alloy scrap, and alumina scrap.

6. A manufacturing method of zeolite from waste, according to claim 3, further comprising the steps of adding one or more crystal minerals having a ratio Si/Al to a zeolite manufacturing raw material prepared by mixing a reaction raw material comprising the silicon-containing waste and the aluminum-containing waste, thereby manufacturing zeolite corresponding to said crystal minerals.

7. A manufacturing method of zeolite from waste, according to claim 4, further comprising the steps of adding one or more crystal minerals having a ratio Si/Al to a zeolite manufacturing raw material prepared by mixing a reaction raw material comprising the silicon-containing waste and the aluminum-containing waste, thereby manufacturing zeolite corresponding to said crystal minerals.

8. A manufacturing method of zeolite from waste, according to claim 5, further comprising the steps of adding one or more crystal minerals having a ratio Si/Al to a zeolite manufacturing raw material prepared by mixing a reaction raw material comprising the silicon-containing waste and the aluminum-containing waste, thereby manufacturing zeolite corresponding to said crystal minerals.

* * * * *